3,535,255
POLYMERS QUATERNIZED TO A
TERTIARY AMINE DYE
Gregoire Kalopissis and Andre Viout, Paris, France, assignors to Societe Anonyme dite: L'Oreal, Paris, France, a company of France
No Drawing. Continuation-in-part of application Ser. No. 546,545, May 2, 1966. This application Feb. 14, 1969, Ser. No. 799,533
Claims priority, application Luxembourg, May 13, 1965, 48,591
Int. Cl. C08c 1/44; C08f 45/14
U.S. Cl. 260—41  9 Claims

ABSTRACT OF THE DISCLOSURE

New polymers and especially cosmetic polymer dyes having a plurality of reactive chloride groups and dyeing amounts of tertiary amine dye that is quaternized to at least some of said chloride groups.

SUMMARY OF THE INVENTION

This application is a continuation-in-part of application 546,545, filed May 2, 1966 which has been abandoned.

This invention relates to new color imparting resins for use in hair lacquers, hair lotions, and hair setting compositions, to certain colorless polymers used in the preparation of said color imparting resins, and to a method of preparing said color imparting resins by reacting said colorless polymers with dyes having a tertiary amine function, and to polymers which may be used to produce colored molded products.

In order to be suitable for use in hair lacquers and hair setting lotions, resins must have certain contradictory qualities which are difficult to reconcile.

In the first place the resins used must be soluble in alcohol, so that they may be easily applied and soluble in water so that they may be readily removed by simply shampooing the hair. On the other hand, they must have a high resistance to humidity so as to avoid giving the hair a sticky appearance which is considered to be unattractive.

Such resins must also be hard and transparent so as to impart lustre to the hair. They should also be easy to remove simply by brushing the hair, without tending to flake off or crumble when the hair is flexed in a normal manner.

The present invention relates to colored resins which have the cosmetic qualities outlined above and qualities favorably compared to those of the best colorless hair lacquers now on the market. The dyes have the further advantage of being incorporated into these resins without undergoing any substantial change in their color, and without any adverse effect on the qualities of the supporting resin. This is very unexpected and desirable from a color reproducibility viewpoint.

Specifically the preferred object of the present invention is to provide color imparting resins which can be used to prepare hair lacquers or setting lotions, these resins are essentially characterized by the fact that they consist of a copolymer comprising, on the one hand, monomers suitable for making cosmetic resins and on the other hand, at least one monomer comprising a reative quaternizable chlorine or bromine group to which at least one dye is chemically bound by quaternization of its tertiary amine group with the chlorine.

The preferred monomers which have a reactive chlorine group are, vinyl chloracetate and N-allyl-chloracetamide. However, many other monomers have chlorine can be used.

Other preferred chlorine or bromine monomers include:

(1) Vinyl esters of halogen carboxylic acids, such as those having the formula:

$$X(CH_2)_nCOOCH=CH_2$$

in which X is Cl or Br, and n is 1-3.

such as:
(a) $ClCH_2$—$COOCH=CH_2$
(b) $BrCH_2$—$COOCH=CH_2$
(c) $Cl(CH_2)_3$—$COOCH=CH_2$ (2) Crotyl, allyl and methallyl esters of halogen carboxylic acids such as those having the formulas:

(a) 

or
(b) $X(CH_2)_nCOOCH=CH-CH_3$ where R is H or $CH_3$, n is 1-3, X is either Cl or Br.

such as
(a) $Cl(CH_2)_2COO-CH_2-CH=CH_2$
(b) 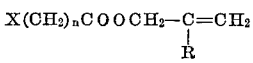
(c) $B_rCH_2COOCH_2CH=CH_2$
(d) $ClCH_2COO-CH=CH-CH_3$ (3) Halogen vinyl ethers such as $$ClCH_2CH_2OCH=CH_2$$

(4) Acrylates and methacrylates of halogen ethyls, such as those having the formula:

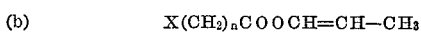

where R is H or $CH_3$ and X may be Cl or Br.

such as:
(a) 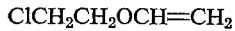
(b) $CH_2-CH_2-COOCH_2CH_2Cl$ (5) N-crotyl-allyl and methallyl halogen alkyl amides such as those having the formulas:

$$X(CH_2)_nCONHCH=CH-CH_3$$
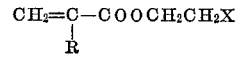

where R is H or $CH_3$, n may be 1-3 inclusive and X may be Cl or Br.

such as
(a) $ClCH_2CONHCH_2CH=CH_2$
(b) 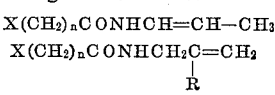
(c) $ClCH_2CONHCH=CH-CH_3$ (6) Allyl, methallyl and crotyl halides, such as (a) $Cl-CH_2-CH=CH_2$
(b) $Cl-CH_2-CH=CH_2$
  $\phantom{Cl-CH_2-CH=}CH_3$
(c) $Br-CH=CH-CH_3$ Other cosmetic monomers which may be used in the manufacture of cosmetic resins are for example, the vinyl esters such as vinyl-acetate, vinyl lactams such as vinylpyrrolidone, the alkyl acrylates and methacrylates, acrylamides or methylacrylamides, whether substituted or not, unsaturated carboxylic acids, such as crotonic acid, acrylic acid, methacrylic acid, or itaconic acid. Many other suitable monomers have been used to make cosmetic resins and they may be used to produce the colorless chloride polymers.

Other suitable monomers include:

(1) Vinyl esters such as:

$$RCOOCH=CH_2$$

where R is an alkyl which has 1 to 18 carbon atoms.

(2) Allyl and methallyl esters, such as:

$$RCOOCH_2C=CH$$
$$\phantom{RCOOCH_2C=C}|$$
$$\phantom{RCOOCH_2C=C}R'$$

in which R is an alkyl having one to 18 carbon atoms and R′ is H or $CH_3$ (3) Vinyl lactams, such as polyvinylpyrrolidone.

(4) Alkyl acrylates and methacrylates, such as $$CH_2=C-COOR'$$
$$\phantom{CH_2=C-C}|$$
$$\phantom{CH_2=C-CO}R$$

where R is H or $CH_3$, R′ is an alkyl having 1 to 8 carbon atoms.

(5) Substituted acrylamides and methacrylamides such as $$CH_2=C-CONHR'$$
$$\phantom{CH_2=C-C}|$$
$$\phantom{CH_2=C-CO}R$$

where R is H or $CH_3$, R′ is an alkyl group which has 1–12 carbon atoms.

(6) Vinyl ethers, such as:

$$ROCH=CH_2$$

in which R is $C_2-C_{18}$, such as $$CH_3(CH_2)_3OCH=CH_2$$

and (7) Unsaturated carboxylic acids, such as crontonic acid, pentenoic acid, butenoic acid, allyloxyacetic acid, etc.

Among the dyes which may be used to carry out the invention and which have a tertiary amine group capable of becoming chemically bonded by quaternization to polymers having a reactive chlorine component are azo dyes, anthraquinone dyes, azinic dyes, those dyes derived from nitrophenylenediamines and those derived from quinolines. These dyes are reacted with the chloride groups on preformed colorless polymer to form the colored polymer.

Dyes yielding blue, red, brown, and yellow may be selected from such dyes having a tertiary amine group.

In order to obtain a desired shade several differently colored copolymers may be physically mixed together, but it is also possible to bond several dyes of various colors to a single originally colorless copolymer of the type according to the invention. In this case, a first colored dye is reacted in a proportion so small that some of the reactive chlorine groups on the polymer remain uncombined, so that a second and even a third colored dye may then be reacted with the unreacted chloride groups on the polymer.

The proporties of the colored copolymers naturally depend on the choice of starting monomers as well as on the proportions in which said monomers are mixed.

The preferred colored copolymers have an absolute viscosity between 2 and 6 cps., but any soluble cosmetic polymer which has the quaternized dyes of the invention can be used.

The term cosmetic polymer as used therein includes any polymer that will not harm human hair and skin, that is soluble in water and/or alcohol solutions and has quaternizing chlorine groups.

If the resin is to be used as a molding resin, it need not be alcohol-water soluble and the resin need not be a cosmetic resin.

The preferred copolymers of the invention contain from 3 to 30% and preferably from 5 to 15% of the chloride monomer and preferably of vinyl chloracetate or N-allylchloracetamide. The more Cl dye groups the greater the color intensity produced.

In addition to the monomers such as vinyl acetate which tend to render the copolymer less soluble, the polymers of the invention should contain, in amounts depending on the properties sought, about 5 to 30% of such monomers as vinyl pyrrolidone or unsaturated carboxylic acids neutralized by any known mineral or organic base which render the resulting copolymer more soluble in alcohol or hydro-alcoholic mixtures, this solubilizing group is indispensable, especially when the resin is to be used as an aerosol or in solution. In general, any ionizing monomer group may be present in the polymer to increase its water-alcohol solubility.

The colored copolymers of the invention may, when incorporated into hair lacquers or setting lotions, be used singly or in mixtures in various proportion with other colorless copolymers such as a mixture of polyvinylpyrrolidone and vinylacetate, or a mixture of polyvinylpyrrolidone or vinyl acetate with an unsaturated acid such as crotonic acid, depending on the intensity of the coloration sought and the physical properties of the resin lacquer desired. For example, hair lacquer compositions containing 0.5–5% by weight of the colored polymer to 4.5% by weight uncolored polymer, have good coloring and hair holding characteristics.

Another object of the present invention is the new article of manufacture which consists of a colorless polymer which is capable of being colored by quaternization with a dye having a tertiary amine group, said polymer being essentially characterized by the fact that it is made from at least one monomer having a reactive chlorine group and at least one other monomer suitable for use in manufacturing cosmetic resins.

These colorless copolymers may, for example, be polymerized when in solution with a low molecular weight alcohol such as ethyl alcohol or isopropyl alcohol, in the presence of a catalyst such as benzoyl peroxide or azodiisobutyronitrile.

The quaternization of the colorless copolymer by the dye is preferably brought about by heating it in a solvent, such as dioxane, acetonitrile, or a low molecular weight alcohol. The colored copolymer is isolated by precipitation and calibrated or tested by measurement of the ionized chlorine.

We have found that condensation of the dye on the copolymer in accordance with the invention does not otherwise affect the cosmetic properties of the colorless copolymers. Hair lacquers or setting lotions made from colored copolymers of the invention have the same cosmetic properties as those made from colorless resins having the same composition, except for the presence of the dye. The coloration of the resin enables them to impart a certain shade to the hair without thereby causing any deterioration in other qualities of the cosmetic product.

Tests we have made show that the colored copolymers of the invention do not stain the skin or any clothing with which they may accidently come in contact with when they are applied to the hair. Moreover, these copolymers may be completely and easily eliminated by washing or brushing the hair, so that the coiffure may be given a particular shade for as short a time as may be desired, without adversely affecting the mechanical properties of the hair. The preferred colored polymers have an unusually high solubility in hydroalcohol solvents, preferrably above 0.2% by weight of the solvent and therefore they can produce deep colorations.

In order that the invention may be more clearly understood, several preferred illustrative examples will be described without limiting the scope of the invention to the details thereof:

Example 1

Preparation of a colorless copolymer comprising 70% by weight vinylacetate, 20% vinylpyrrolidone and 10% N-allyl-chloracetamide.

The monomers are placed in a flask having an agitator, a reflux condenser, a thermometer, and a tube for admitting nitrogen:

|  | G. |
|---|---|
| Vinylacetate | 70 |
| Vinylpyrrolidone | 20 |
| N-allyl-chloracetamide | 10 |

220 g. of absolute ethyl alcohol and 5 g. of azo-diisobutyronitrile are added and the mixture heated to reflux for 20 hours. After cooling, ether is used to precipitate the copolymer, a 75% yield was obtained.

*Analysis.*—Calculated (percent): organic Cl, 2.65. Found (percent): organic Cl, 2.53; which corresponds to condensation of 95% of the condensed reactive monomer.

A 5% solution of this polymer in acetylene tetrachloride at 35° C. had an absolute viscosity of 2 cps.

Example 2

Preparation of a copolymer comprising 60% by weight vinyl acetate, 20% vinylpyrrolidone and 20% N-allyl-chlor-acetamide.

The same process is used under the same conditions as those described in Example 1, except that the concentration of N-allyl-chlor-acetamide is 20% instead of 10%. A 70% yield of the copolymer sought is secured by precipitation with ether. The copolymer is in the form of a white powder.

A 5% solution of this polymer in acetylene tetrachloride at 35° C. had an absolute viscosity of 2.80 cps.

*Analysis.*—Calculated (percent): Organic Cl, 5.3. Found (percent): organic Cl, 4.9; which corresponds to a 92.4% condensation of the chlorinated monomer.

Example 3

Preparation of a copolymer comprising 70% by weight vinyl acetate, 20% vinylpyrrolidone and 10% vinyl chloracetate.

The same process is used under the same conditions as those described in Example 1, except that the N-allyl-chloracetamide is replaced by the vinyl chloracetate. After precipitation and drying a 70% yield of the desired copolymer is obtained.

*Analysis.*—Calculated (percent): Organic Cl, 2.95. Found (percent): organic Cl, 2.78; which corresponds to a 94% condensation of the chlorinated monomer.

A 5% solution of this polymer in acetylene tetrachloride at 35° C. had an absolute viscosity of 3.20 cps.

Example 4

Preparation of a polymer containing 70% by weight vinyl acetate, 20% vinyl pyrrolidone and 10% N-allyl-chloroacetamide.

The following mixture of monomers was placed in a flask having an agitator, with an inlet for nitrogen, a thermometer, and a reflux condenser:

|  | G. |
|---|---|
| Vinyl acetate | 140 |
| Vinyl pyrrolidone | 140 |
| N-allyl-chloro-acetamide | 20 |
| Azo-di-iso-butyronitrile | 3 |

This mixture was heated to reflux, allowing the nitrogen to bubble for 7 hours. The mixture thickened. The heat was turned off. After cooling, we obtained a yellowish mass which was ground to a powder.

The yield was quantitative (100%).

We determined the absolute viscosity in a 5% polymer solution in acetylene tetrachloride at 35° C. The viscosity obtained was 4.80 cps.

Analysis of the organic chloride gives the following results.

*Analysis.*—Calculated (percent): Organic Cl, 2.65. Found (percent): Organic Cl, 3.12.

Example 5

Preparation of uncolored copolymer containing 70% by weight vinyl acetate, 10% by weight vinylacetic acid, 10% by weight ether vinylisobutylic and 10% by weight vinyl chloracetate.

The monomers are placed in a flask having an agitator, a reflux condenser, a thermometer and a nitrogen inlet tube:

|  | G. |
|---|---|
| Vinyl acetate | 140 |
| Vinylacetic acid | 20 |
| Vinylisobutylic ether | 20 |
| Vinyl chloracetate | 20 |

Add 113 g. of absolute ethyl alcohol and 16 g. of azo-bis-isobutyronitrile and reflux for 26 hours. After cooling, add ether to precipitate the copolymer. After drying the copolymers yield was 71%.

*Analysis.*—Calculated (percent): organic Cl, 2.94. Found (percent): organic Cl, 2.96; which corresponds to 100% of the condensed reactive monomer.

Example 6

Preparation of a polymer containing 60% by weight vinyl acetate, 10% allyl stearate, 20% vinylpyrrolidone and 10% chloroethyl acrylate.

The monomers were placed in a flask having an agitator, a reflux condenser, a thermometer and a nitrogen inlet tube:

|  | G. |
|---|---|
| Vinyl acetate | 60 |
| Allyl stearate | 10 |
| Vinylpyrrolidone | 20 |
| Chloroethyl acrylate | 10 |

80 g. of absolute ethyl alcohol and 4 g. of azo-bis-isobutyronitrile were added to the mixture and it was refluxed for 15 hours. The polymer was precipitated with ether and the yield was 74% and 76% of the reactive chloro monomer polymerized.

Example 7

Preparation of a polymer containing 80% by weight vinyl acetate, 10% allyloxyacetic acid, and 10% chloroethylvinyl ether.

The monomers were placed in a flask having an agitator, a reflux condenser, a thermometer and a nitrogen inlet tube:

|  | G. |
|---|---|
| Vinyl acetate | 160 |
| Allyloxyacetic acid | 20 |
| Chloroethylvinyl ether | 20 |

160 g. of absolute ethyl alcohol and 6 g. azo-bis-isobutyronitrile were added to the mixture and it was refluxed for 24 hours. The polymer was precipitated with ether and the yield was 68% and 50% of the reactive chloro monomer polymerized.

Example 8

Preparation of a polymer containing 75% by weight vinyl propionate, 10% allyloxyacetic acid, 5% methyl methacrylate and 10% allyl bromoacetate.

The polymer was prepared in the manner disclosed in Example 7 using the following monomer mixture:

|  | G. |
|---|---|
| Vinyl propionate | 75 |
| Allyloxyacetic acid | 10 |
| Methyl methacrylate | 5 |
| Allyl bromoacetate | 10 |

Example 9

Preparation of a polymer containing 80% by weight vinyl acetate, 10% vinyl pyrrolidone, 5% tertiary butyl-acrylamide and 5% methallyl chloropropionate.

The polymer was prepared in the manner disclosed in Example 7 using the following monomer mixture:

|  | G. |
|---|---|
| Vinyl acetate | 80 |
| Vinylpyrrolidone | 10 |
| Tertiary butylacrylamide | 5 |
| Methallyl chloropropionate | 5 |

The polymer yield was 65% and 65% of the reactive chloro monomer polymerized.

Example 10

Quaternization of the copolymer of Example 1, using a 1,4-dihydroxy 2-[(γ piperidino-propyl)-amino] anthraquinone dye having the formula:

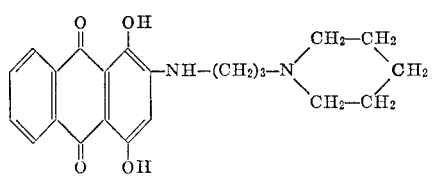

23.3 g. of the copolymer described in Example 1 and 5.70 g. of 1,4-dihydroxy 2-[(γ piperidino-propyl)-amino] anthraquinone, which corresponds to the quantity of organic chlorine in the copolymer, were placed in a flask having an agitator and a reflux condenser.

90 cc. of dioxane is added and brought to reflux. After 16 hours, the colored copolymer is precipitated, any remaining trace of uncombined dye is extracted with ether, and the copolymer is dried.

A yield of 65% by weight of a cyclamen red powder, which is soluble in alcohol and in hydro-alcoholic solutions, is obtained.

*Analysis.*—Calculated (percent): Ionized Cl, 1.8. Found (percent): Ionized Cl, 1.7.

The percentage of quaternization is 94%.

Example 11

Quaternization of the copolymer of Example 1 with a 1,4-diamino 5-[(γ diethylamino propyl)-amino] anthraquinone dye having the formula:

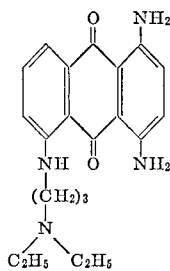

20 g. of the copolymer of Example 1 in 60 cc. of acetonitrile is heated to reflux with 5.2 g. of the above dye, while keeping track of the ionized chlorine being formed. After 30 hours of reflux the colored copolymer is precipitated, excess dye extracted with ether, and the copolymer dried.

A yield of 74% by weight of a blue powder, which is soluble in alcohol, or in a hydro-alcoholic medium, is obtained.

*Analysis.*—Calculated (percent): Ionized Cl, 2.01. Found (percent): Ionized Cl, 1.65.

The percentage of quaternization is 82%.

Example 12

Quaternization of the copolymer of Example 1 with a 2-amino-4-nitro 1-[(γ diethylamino propyl)-amino] benzene dye having the formula:

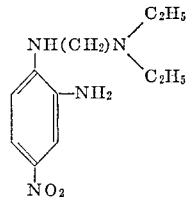

15 g. of the copolymer of Example 1, together with 2.84 g. of the above nitrated dye and 50 cc. of dioxane is placed in a flask.

The mixture is heated to reflux for 35 hours, while keeping track of the formation of ionized chlorine. The copolymer is then precipitated, subjected to extraction with ether, and dried. The result is a yellow powder, soluble in alcohol.

*Analysis.*—Calculated (percent): Cl, 2.1. Found (percent): Cl, 1.68;

which corresponds to 80% quaternization.

Example 13

Quaternization of the copolymer of Example 2 with a 1,4-dihydroxy 2-[(γ piperidino-propyl)-amino] anthraquinone dye having the formula:

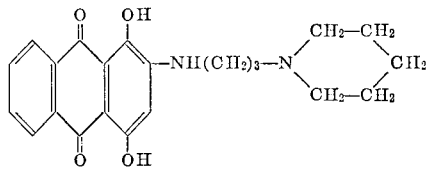

15 g. of the copolymer described in Example 2 and 7.8 g. of the above dye (which corresponds to the quantity of organic chlorine contained in the copolymer) are introduced into a flask. 90 cc. of dioxane is added and the mixture heated to reflux.

After 36 hours of heating, the colored copolymer is precipitated, subjected to extraction with ether, and dried.

An 84% yield by weight of a cyclamen red powder is obtained. The powder is soluble in alcohol and in a hydroalcoholic mixture.

*Analysis.*—Calculated (percent): Ionized Cl, 3.22. Found (percent): Ionized Cl, 2.54;

which corresponds to 78.8% quaternization.

Example 14

Quaternization of the copolymer of Example 3 with a 1,4-diamino 5-[(γ diethylamino propyl)-amino] anthraquinone dye having the formula:

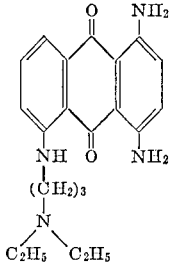

20 g. of the copolymer described in Example 3 and 5.73 g. of the above anthraquinone dye (which corresponds to the quantity of chlorine in the copolymer) is introduced into a flask. 80 cc. of dioxane are added and brouhgt to reflux.

After heating for 24 hours, the copolymer is precipitated, subjected to extraction, and dried.

A yield of 80% by weight of a blue powder is obtained.

This powder is soluble in alcohol and in a hydro-alcoholic mixture.

*Analysis.*—Calculated (percent): Ionized Cl, 2.1. Found (percent): ionized Cl, 1.68; which corresponds to 80% quaternization.

Example 15

Quaternization of the copolymer of Example 1 with a 2,4 - dihydroxy - 3 - phenylazo-quinoline dye having the formula:

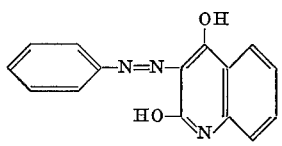

15 g. of the copolymer described in Example 1 and 2.86 g. of the above dye (which corresponds to the quantity of chlorine in the copolymer) are introduced into a flask. 50 cc. of dioxane is added and the mixture heated to reflux for 24 hours.

After cooling the colored copolymer is precipitated, subjected to extraction with ether, and dried.

A yield of 83% by weight of a yellow powder is obtained. This powder is soluble in alcohol and in a hydro-alcoholic mixture.

*Analysis.*—Calculated (percent): Ionized Cl, 2.20. Found (percent): ionized Cl, 1.76; which corresponds to 80% quaternization.

Examples showing the use of the new colored resins hereinbefore described as ingredients in hair treating preparations may be found in our copending application Ser. No. 523,525, filed Jan. 28, 1966.

Example 16

Quaternization of the copolymer of Example 5 with 4 - nitro - 3 - N,N-dimethylamino propylamino-1-dimethylamino benzene having the formula:

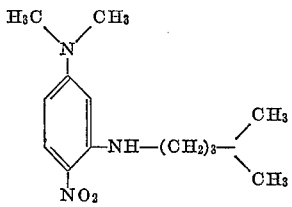

The colored polymer is made by mixing 12.5 g. of the copolymer of Example 5, 2.75 g. of the above dye and 1.17 g. of 2 - amino - 2-methyl-1,3 propanediol, in a flask having an agitator and a reflux condenser.

45 g. of acetonitrile was added and the mixture was refluxed for 24 hours.

The polymer was precipitated with ether, dried and the yield was 68%. The product was a yellow powder soluble in alcohol and hydroalcohol solutions and all of the chloride ion was quaternized.

Example 17

Quaternization of a copolymer of Example 6 with 4-N-methylamino - 3 - nitro - 1 - N'-(β-methyl hydroxyethyl) amino]ethylamino benzene having the formula:

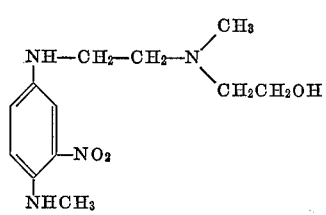

30 g. of acetonitrile, 8 g. of the copolymer of Example 6 and 1.21 g. of the dye were refluxed for 24 hours and heated in the same manner as in Example 16 to produce a violet powder soluble in alcohol and hydroalcohol. The yield was 70% and all of the chloride ions were quaternized.

Example 18

Quaternization of a copolymer of Example 7 and 4-N-methylamino - 3 - nitro - 1-N,N-(methyl-β-piperidinoethyl)amino benzene having the formula:

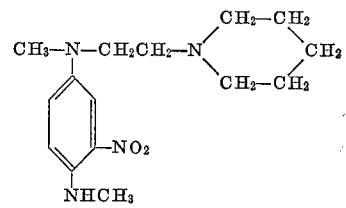

5 g. of the polymer of Example 7, 0.68 g. of the dye, 0.45 g. of 2 - amino - 2 - methyl-1,3 propanediol and 28 g. of acetonitrile were refluxed for 48 hours and the product was precipitated in the manner described in Example 16. The product is a cyclamen red powder. 30% of the chloride ion was quaternized.

Example 19

Quaternization of a polymer of Example 8 with 1-amino-3-γ-dimethylamino)propylamino-4-nitrobenzene.

40 g. of acetonitrile, 8.5 g. of the polymer of Example 8, 0.76 g. of 2 - amino - 2 - methyl 1,3 propanediol and 1.26 g. of the above dye were refluxed for 24 hours. The product was precipitated in the manner shown in Example 16. The yield was 72%. The product was a yellow powder that was soluble in alcohol and hydro-alcohol. 90% of the bromide ion was quaternized.

Example 20

Quaternization of the copolymer of Example 9 and N-diethylaminoethyl N - [(4 - methylamino - 3 - nitro)phenyl]-N'[(4' - nitro)phenyl] ethylenediamine having the formula:

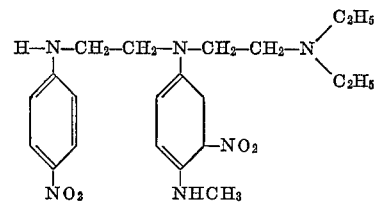

24 g. acetonitrile, 6.9 g. of the polymer of Example 9, and 0.65 g. of the above dye were refluxed for 24 hours. The product was precipitated in the manner shown in Example 16. The product is a reddish-brown powder in which 56% of the chloride ion has been quaternized.

Example 21

The following solution was prepared:

|  | G. |
|---|---|
| The copolymer described in Example 18 | 5 |
| The copolymer described in Example 11 | 3 |
| Ethyl alcohol | Q.s.p. 100 |

25 g. of this solution is mixed with 45 g. of Freon 11 and 30 g. of Freon 12.

After spraying it on chestnut brown hair, one obtains "tulip black" reflections.

Example 22

The following is prepared:

|  | G. |
|---|---|
| The copolymer described in Example 17 | 5 |
| Polyvinylpyrrolidone | 3 |
| Ethyl alcohol | Q.s.p. 100 |

25 g. of this solution is mixed with 45 g. of Freon 11 and 30 g. of Freon 12.

After spraying it on chestnut brown hair, one obtains violine reflections.

Example 23

The following is prepared:

|   | G. |
|---|---|
| The copolymer described in Example 20 | 4 |
| The copolymer described in Example 9 | 4 |
| Ethyl alcohol | Q.s.p. 100 |

25 g. of this solution is mixed with 45 g. of Freon 11 and 30 g. of Freon 12.

After spraying it on the hair, one obtains beige rose reflections.

Example 24

The following is prepared:

|   | G. |
|---|---|
| Copolymer described in Example 16 | 1 |
| Copolymer described in Example 17 | 1 |
| Polyvinylpyrrolidone | 5 |
| Ethyl alcohol | Q.s.p. 100 |

25 g. of this solution is mixed with 45 g. of Freon 11 and 30 g. of Freon 12.

After spraying it on chestnut or blonde hair, one has a lacquer which has gold reflections.

Example 25

The following is prepared:

The copolymer described in Example 18: 1 g.
The copolymer described in Example 7: 1 g.
Ethyl alcohol: 50 ml.
Water: Q.s.p. 100 ml.

When this setting solution is sprayed on chestnut hair, it provides violet reflections.

Example 26

The following is prepared:

|   | G. |
|---|---|
| The copolymer described in Example 10 | 5 |
| The copolymer described in Example 11 | 3 |
| Ethyl alcohol | Q.s.p. 100 |

25 g. of this solution is mixed with 45 g. of Freon 11 and 30 g. of Freon 12.

After spraying it on chestnut hair one obtains "tulip black" reflections.

Example 27

The following is prepared:

|   | G. |
|---|---|
| The copolymer described in Example 11 | 1 |
| Polyvinylpyrrolidone | 5 |
| Ethyl alcohol | Q.s.p. 100 |

25 g. of this solution is mixed with 48 g. of Freon 11 and 28 g. of Freon 12.

When this composition is sprayed on chestnut brown hair, one obtains deep blue reflections. If the hair contains white hairs, these are colored in light blue.

Example 28

The following is prepared:

The copolymer described in Example 10: 8 g.
The copolymer described in Example 1: 1 g.
Triethanolamine Q.s.p.: p.H7
Ethyl alcohol: 50 cc.
Water: Q.s.p.: 100 cc.

When this setting solution is sprayed on chestnut hair, it provides after drying violine reflections.

This solution practically does not stain the hands.

It is also possible to realize according to the invention colorless polymers derived only from monomers containing quaternizable halide groups. Among the monomers which may be used to realize such colorless polymers is the vinylchloracetate which may be homopolymerized, or copolymerized with allylchloracetate.

The color imparting polymers realized with such polymers allow to obtain a stronger capacity of dying, because a greater number of dye molecules may be bonded to them.

Among the dyes which may be used to carry out the invention and which have a tertiary amine group capable of becoming chemically bonded by quaternization to polymers having a reactive chlorine component are:

Amino - 2 - benzothiazole-N-ethyl, N-formamido ethylaniline

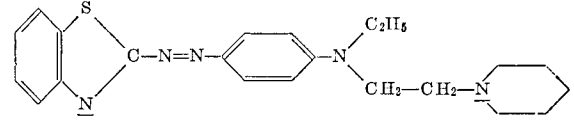

Amino - 2 - benzothiazole-N-ethyl, N-formamido ethylaniline

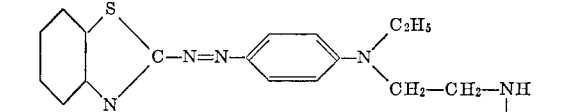

N-ethyl, N-β-piperidinoethyl amino-4-nitro 4' azobenzene

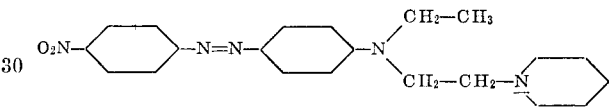

N-ethyl, N-β-piperidinoethyl amino-4-dinitro 2', 4' azobenzene

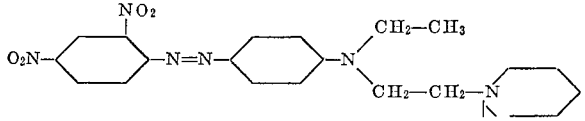

4-piperidinomethylphenyl azo 1' naphthol 2'

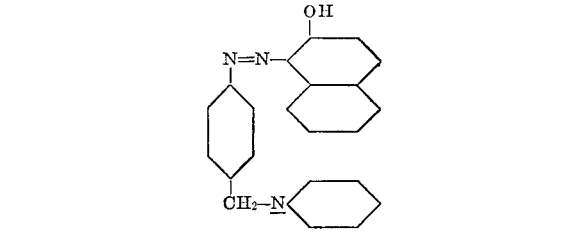

4-dimethylaminophenyl azo 1-1' hydroxy 2' naphthalene

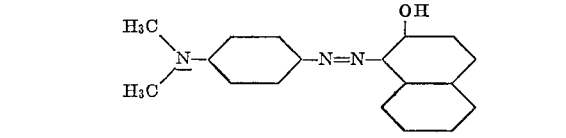

the underlined N are corresponding to those which can be quaternized.

What is claimed is:

1. A colored copolymer which is soluble in water, alcohol and mixtures thereof comprising a copolymer which has a plurality of polymerized monomer groups which contain quaternizable halide groups, said halide being selected from the group consisting of chloride and bromide, and quaternized color imparting amounts of tertiary amine dye groups that are bonded to the copolymer by quaternization of the tertiary amine groups with at least some of said halide groups.

2. The copolymer of claim 1, wherein said quaternizable halide is derived from polymerized monomer vinyl chloracetate group in said copolymer.

3. The copolymer of claim 1, wherein said quaternizable halide is derived from polymerized monomer N-allylchloracetamide groups in said copolymer.

4. The copolymer of claim 1, wherein said quaternizable halide is derived from a polymerized monomer in said copolymer selected from the group consisting of vinyl esters of halogen carboxylic acid, crotyl, allyl and methallyl esters of halogen carboxylic acid, vinyl ether halides, acrylate and methacrylate of halogen ethyl, N-crotyl, allyl and methallyl halogen alkyl amines, and allyl, methallyl and crotyl halides.

5. The copolymer of claim 1, in which said quaternizable halide group is polymerized with a monomer selected from the group consisting of vinyl esters, allyl esters, methallyl esters, vinyl lactams, alkyl acrylates, alkyl methacrylates, substituted acrylamides and methacrylamides, vinyl ethers, and unsaturated carboxylic acids.

6. The copolymer of claim 1, in which said dye is selected from the group consisting of azo, anthraquinone, azinic, nitrophenylenediamine and quinoline tertiary amine dyes.

7. The copolymer of claim 6, which has from 3 to 30% by weight of said polymerized monomer quaternizable halide group.

8. The polymer of claim 1, in which said quaternizable halide groups in said polymerized monomer are methylene halide groups.

9. The polymer of claim 1, in which said quaternizable halide groups are side chains on said polymer which contain terminal —$CH_2X$ groups, in which X is chlorine or bromine.

References Cited

UNITED STATES PATENTS

| | | | |
|---|---|---|---|
| 2,752,324 | 6/1956 | Craig et al. | 260—85.7 |
| 2,763,633 | 9/1956 | Gray | 260—85.7 |
| 2,941,980 | 6/1960 | Robinson | 260—85.7 |
| 3,050,506 | 8/1962 | Sexsmith | 260—85.7 |
| 3,190,860 | 6/1965 | Fertig | 260—80.73 |
| 3,251,743 | 5/1966 | Hahn et al. | 260—86.1 |

FOREIGN PATENTS

| | | |
|---|---|---|
| 993,181 | 5/1965 | Great Britain. |

MORRIS LIEBMAN, Primary Examiner

L. T. JACOBS, Assistant Examiner